Sept. 20, 1966  P. V. N. HELLER  3,274,522
BISTABLE ELEMENT
Filed Jan. 15, 1962  5 Sheets-Sheet 1
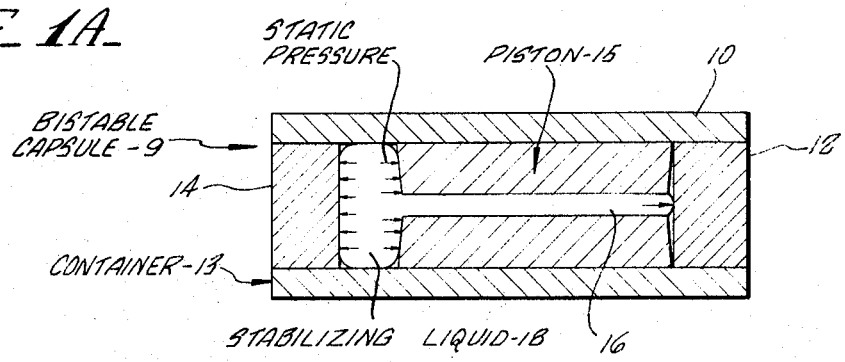
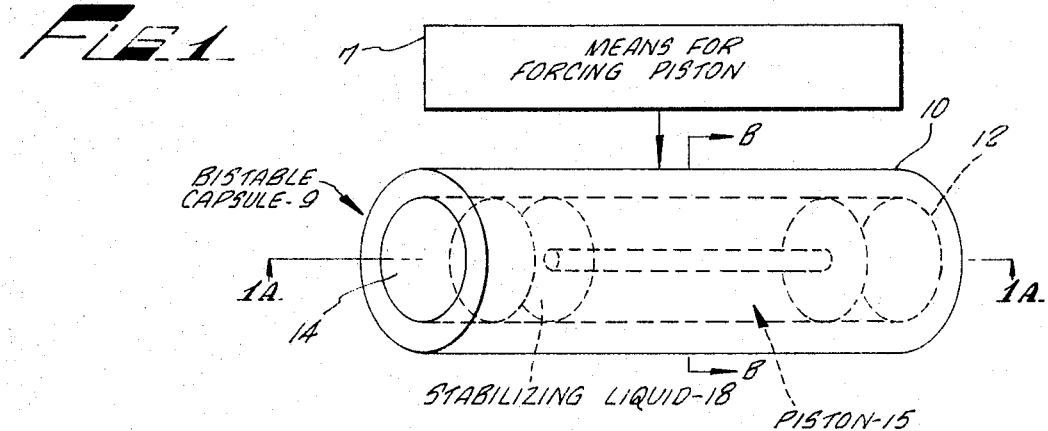
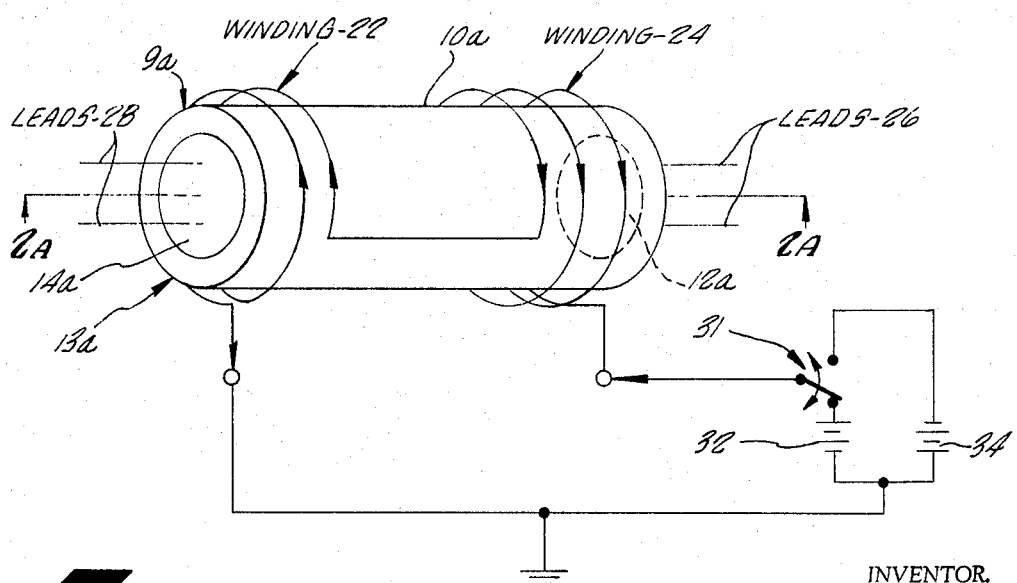
INVENTOR.
PETER V. N. HELLER
BY
Christie, Parker & Hale
ATTORNEYS.

INVENTOR.
PETER V.N. HELLER
BY
Christie, Parker & Hale
ATTORNEYS.

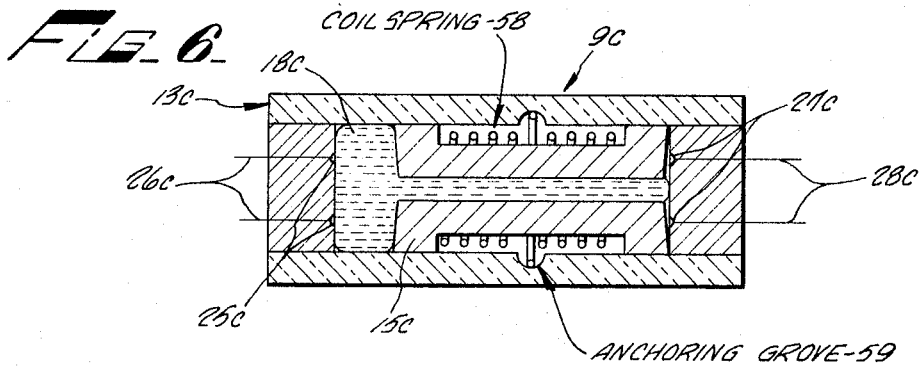
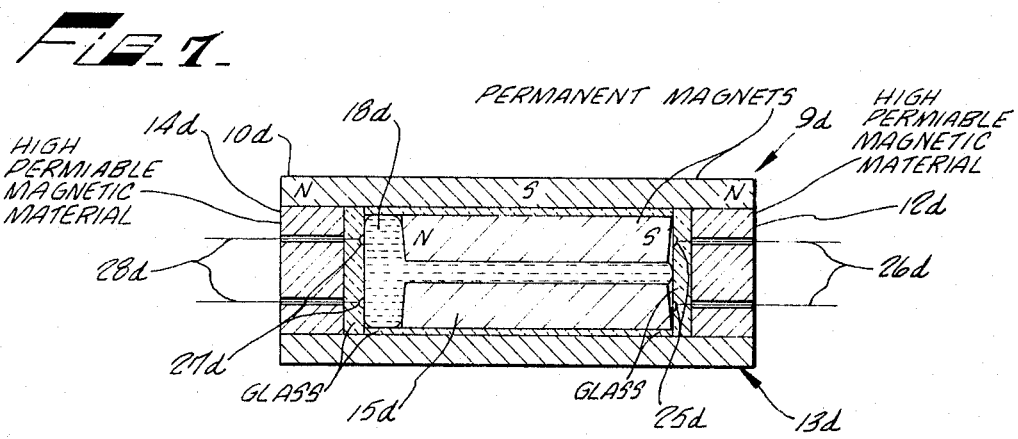
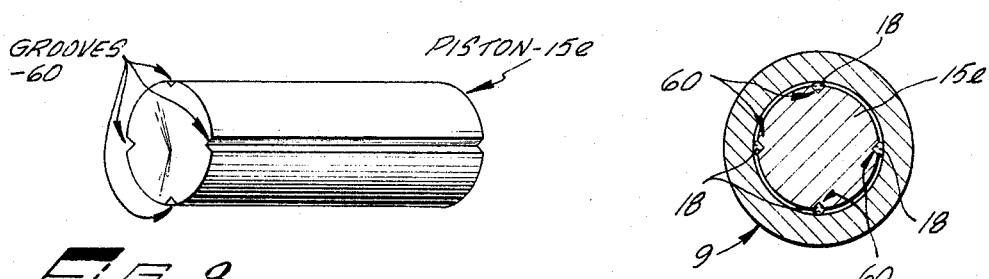
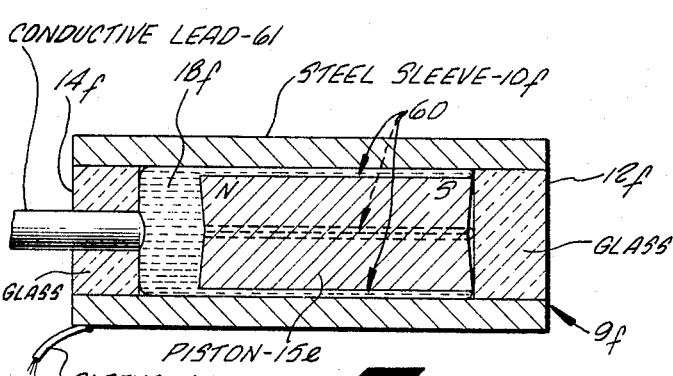

Sept. 20, 1966 P. V. N. HELLER 3,274,522
BISTABLE ELEMENT
Filed Jan. 15, 1962 5 Sheets-Sheet 5
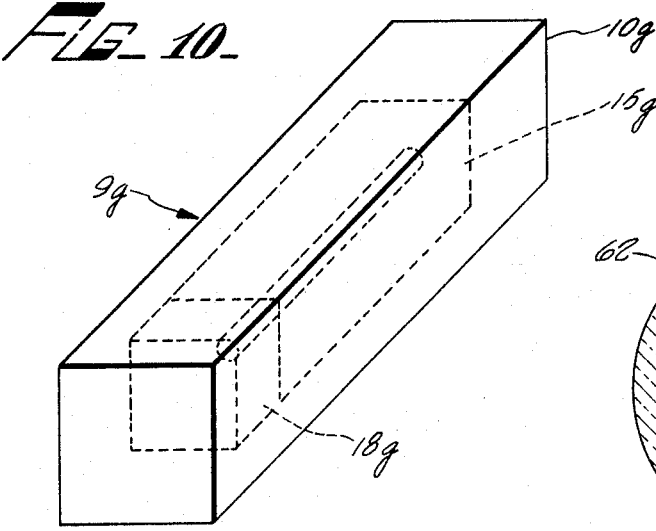
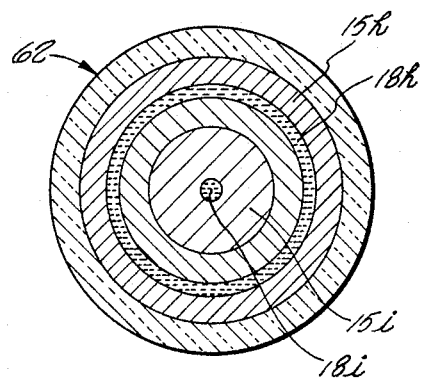
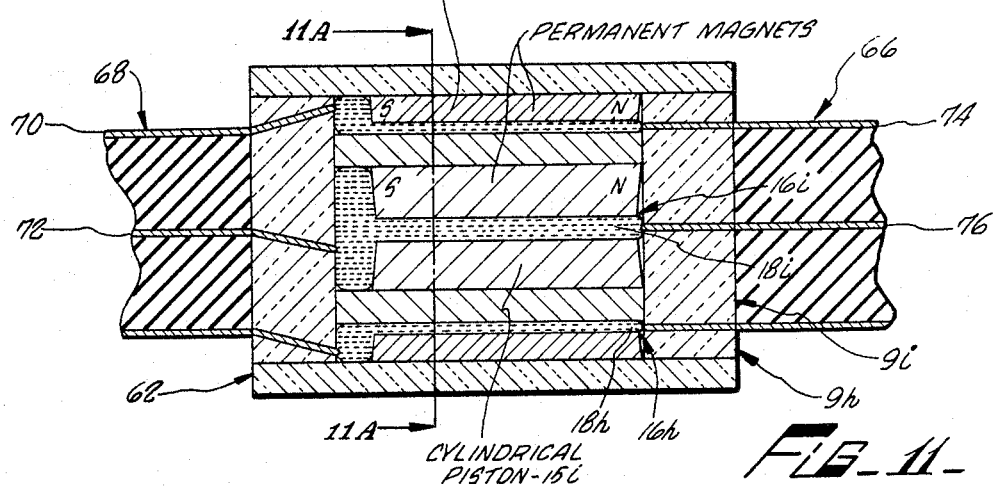
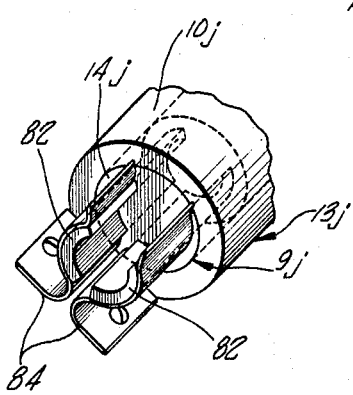
INVENTOR.
PETER V. N. HELLER
BY
Christie, Parker & Hale
ATTORNEYS

United States Patent Office 3,274,522
Patented Sept. 20, 1966

3,274,522
BISTABLE ELEMENT
Peter V. N. Heller, P.O. Box 147, Dana Point, Calif.
Filed Jan. 15, 1962, Ser. No. 166,151
14 Claims. (Cl. 335—5)

This invention relates to mechanical bistable elements. A specific embodiment of the present invention is a bistable mechanical switching element.

Modern mechanical and electronic apparatuses create a need for very small mechanical bistable elements. For example, miniaturized mechanical switches are needed in modern aircraft and missiles.

A specific embodiment of the present invention includes a self latching bistable element which may be mounted in any position and readily lends itself to miniaturization. Also, the specific embodiment of the present invention is capable of withstanding accelerative forces many times the pull of gravity without changing state. In addition, the bistable element is hermetically sealed and the interior is completely contamination proof.

Another specific embodiment of the present invention is in the form of a small bistable switching element about the size of a grain of rice. The bistable switching element embodying the present invention not only has the above characteristics but, in addition, has extremely low contact resistance and relatively high current carrying capability. Also, the switching element has uniform contact resistance and inductance. Additionally, the switching element embodying the present invention is completely hermetically sealed and explosion proof. Further, the bistable switching element of the present invention is easily polarized to form a monostable element.

Briefly, the bistable switching element embodying the present invention comprises a container having an elongated cylindrical shaped chamber therein. Each end of the cylindrical chamber has a pair of electrical contacts exposed within the chamber. Additionally, each end of the cylindrical chamber has a pair of electrical contacts exposed within the chamber. Additionally, each end of the cylindrical chamber has a pair of conductors connected to provide an electrical path to the contacts. A cylindrical shaped piston is positioned within the chamber and has a length less than that of the chamber to provide a void space for movement within the chamber. The piston has a circular passageway for inter-connecting the void space at the ends of the piston and is made of a magnetic material permanently magnetized substantially parallel with the axis of the piston. A quantity of mercury substantially fills the void space within the chamber and the piston passageway. A solenoid winding is wound around the container for providing a magnetic field at the ends of the piston of sufficient magnitude and polarity that the piston is forced at one of the ends of the chamber.

These and other aspects of the present invention may be more fully understood with reference to the following detailed description of the figures of which:

FIG. 1 is partly a perspective and partly a block diagram of a bistable capsule and means for forcing the piston of the capsule and embodying the present invention;

FIG. 1A is a cross-sectional view of the bistable capsule of FIG. 1 along the lines A—A;

FIG. 2 shows a specific example of the bistable capsule and means for forcing the piston of the capsule of FIG. 1 in the form of an automatic switch. FIG. 2 is a perspective view of a bistable switching capsule together with a schematic diagram of magnetic windings and electrical circuits for actuating the piston of the capsule and embodying the present invention;

FIG. 4 is a side view of a rotatable knob with a portion of the knob broken away to show a plurality of permanent magnets for actuating the pistons of a plurality of bistable switching capsules and embodying the present invention;

FIG. 6 is a cross-sectional view of a spring polarized capsule for use in place of the bistable capsules of FIGS. 1 and 2;

FIG. 7 is a cross-sectional view of a magnetically polarized capsule for use in place of the bistable capsules of FIGS. 1 and 2;

FIG. 8 is a perspective view of an alternate piston for use in the bistable capsules of FIGS. 1 and 2;

FIG. 8A is a cross-sectional view of the bistable capsule of FIG. 1 along the lines B—B with a piston as shown in perspective in FIG. 8 mounted therein;

FIG. 9 is a perspective view of an alternate bistable capsule for use in FIGS. 1 and 2 and embodying the present invention;

FIG. 10 is a perspective view of an alternate bistable capsule for use in FIGS. 1 and 2, and embodying the present invention;

FIG. 11 is a cross-sectional view of an alternate bistable switching capsule for use in FIGS. 1 and 2 and embodying the present invention;

FIG. 11A is an end view of the bistable capsule of FIG. 11 along the line A—A with the portion broken away in FIG. 11 shown in full; and FIG. 12 is a perspective view of an alternate contact and lead arrangement for use in the bistable capsule of FIG. 2.

Figure 2A:
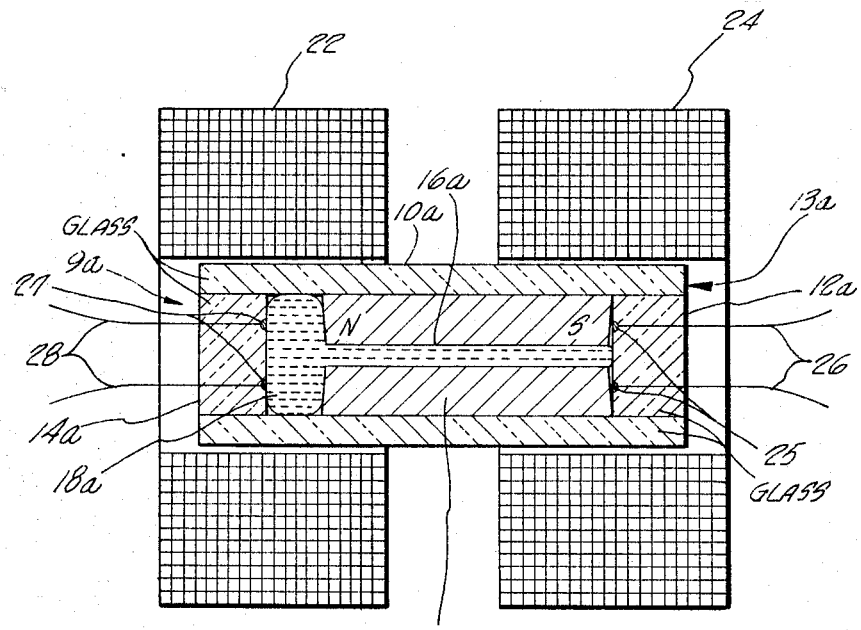
FIG. 2A is a cross-sectional view of the bistable capsule together with an actual cross-sectional view of the winding, shown schematically in FIG. 2, along the lines A—A of FIG. 2.

Refer now to FIGS. 1 and 1A. FIG. 1 shows a perspective and block diagram of a bistable capsule 9 and means 7 for forcing the piston 15 of the capsule 9. The FIG. 1A shows a cross-sectional view of the bistable capsule 9 along the lines A—A of FIG. 1. The bistable capsule 9 has a container 13 including a tubular shaped sleeve 10 and plugs 12 and 14 which are inserted at opposite ends of the tubular sleeve 10. Inside of the sleeve 10 in between the two plugs 12 and 14, an elongated cylindrical shaped chamber is formed. An elongated cylindrical shaped piston 15 is placed inside the chamber. The outside diameter of the piston 15 is slightly smaller than the diameter of the chamber. Also, the length of the piston 15 is shorter than that of the chamber, thereby leaving a void space in the chamber at the ends of the piston 15. The piston 15 has a circular passageway 16 extending along the axis of the piston, thereby connecting the void spaces in the chamber at the ends of the piston 15. A stabilizing liquid 18 is filled in the void space in the chamber and in the passageway 16 inside of the piston 15.

In a preferred arrangement of the bistable capsule 9, the diameter of the passageway 16 and the surface tension and the viscosity of the stabilizing liquid 18 are such that the passageway 16 restricts the flow of the stabilizing liquid 18 from one end of the piston 15 to the other. Also, at least the ends of the piston 15 and the plugs 12 and 14 at the surfaces exposed to the chamber are non-wettable to the stabilizing liquid 18. Also, in the preferred arrangement of the bistable capsule 9 the density of the piston 15 is less than that of the stabilizing liquid 18. However, it should be understood that these limitations are not essential to the invention.

The capsule 9 has two states. The two states are determined by the position of the piston 15 which is either positioned against the plug 12 or the plug 14. With the limitations enumerated above, the position of the piston 15 is not only insensitive to position of the capsule 9 and stays in its previous position but may be subjected to forces many times that of gravity without moving from the end of the chamber in which it has been placed. The reason for this stability is in part due to the large forces exerted on the large surface areas at the ends of the piston 15 by the stabilizing liquid 18 and the relatively small or non-existant forces at the opposite end of the piston tending to oppose the large forces. When the bistable capsule 9 is positioned vertically with the stabilizing liquid 18 at the bottom of the piston 15, the forces, due to the greater density of the stabilizing liquid 18, in between the plug and the piston 15 maintain the piston 15 at the top of the chamber. If the bistable capsule 9 is positioned vertically with the stabilizing liquid 18 on the top of the piston 15 the forces due to the mass of the liquid 18 on the large area at the end of the piston 15 is greater than any tendency of the stabilizing liquid 18 to seep in between the piston 15 and the plug and exert forces in the opposite direction. Also, when the bistable capsule 9 is positioned with the piston horizontal, the hydrostatic pressure of the stabilizing liquid 18 on the area at the end of the piston 15 maintains it in the state in which it has been placed.

A preferred stabilizing liquid 18 is mercury. It has been found that mercury forms a self-enclosing elastic membrane and that the hydrostatic pressure within the membrane is greatest when the spherical radius on the mercury, as shown at the top of FIG. 2A, is the smallest.

The means 7 for forcing the piston may be in the form of a manual mechanical force applied directly to the piston 15 or magnetic forces as described in connection with FIGS. 2, 3 and 4.

Refer now to FIG. 2 wherein an automatic switch embodying the present invention is shown. FIG. 2A shows a cross-sectional view of the bistable capsule 9a of FIG. 2 along with an actual cross-sectional view of the windings 22 and 24 shown in schematic form in FIG. 2 along the lines A—A of FIG. 2. The automatic switch has a bistable switching capsule 9a similar to the bistable capsule 9 of FIG. 1. The container 13a, including plugs 12a and 14a and the sleeve 10a, is made of a non-conductive ceramic glass. A pair of contacts 25 and 27 and a pair of connected leads are molded in the plugs 12a and 14a, respectively. The contacts 25 and 27 are made of a non-mercury wettable conductive material such as the metal molybdenum. The piston 15a of the bistable capsule 9a is made of a non-conductive permanent magnetic ferrite material. Ferrite material is non-wettable to mercury. The piston 15a is permanently magnetized parallel to the axis thereof and poled with opposite magnetic poles at the ends of the piston. The ends of the piston 15a are concave such that there is a small gap in between the ends of the piston 15a and the contacts 25 and 27 when the piston 15a is positioned against the corresponding plugs.

The stabilizing liquid 18a is a quantity of mercury 18a. The mercury is the pole or shorting medium for connecting together either the pair of contacts 25 or the pair of contacts 27 depending on the position of the piston 15a.

The contacts 25 and 27 are symmetrical about and are positioned at a sufficient radial distance from the channel 16a that the slight bulge of mercury at the end of the channel 16a does not make contact with the contacts in the end of the chamber against which the piston 15a is positioned.

The windings 22 and 24 are solenoid type windings wound around and connected to the container 13a and the middle of the windings are spaced apart roughly the length of the piston 15a. The solenoid windings 22 and 24 are oppositely poled and serially connected together such that when current flows through the windings 22 and 24 as indicated schematically in FIG. 2, magnetic fields of opposite polarity are formed at the ends of the piston 15a.

A single pole, double throw switch 31 is provided for switching two oppositely poled batteries 32 and 34 across the windings 22 and 24. When one of the batteries is connected to provide current through the windings 22 and 24 such that a magnetic field is generated having the same polarity as the end of the piston 15a referenced by the symbol N and an oppositely poled magnetic field generated at the opposite end of the piston 15a, the force on the piston 15a relative to the container 13a is sufficient to force the piston 15a to the position shown in FIG. 2A. When the current in the windings 22 and 24 and the magnetic field is reversed, the piston 15a is forced against the opposite end of the chamber. Electrical contact is made between the pair of contacts at the end of the chamber where the mercury in the void space of the chamber is located.

Normally current will flow through the windings 22 and 24 throughout the transfer of the piston 15a from one end of the chamber to the other. However, it should be noted that once the mercury 18a starts flowing through the channel 16a to the opposite end of the piston 15a and the piston 15a starts moving in the opposite direction from the movement of the mercury 18a, the momentum due to the movement of the mercury 18a and the piston 15a is such that the transfer will be completed even through the current in the windings, and therefore the magnetic field, is removed.

It should also be noted that the shorter the length of the piston 15a, the faster the piston will switch from one end of the chamber to the other since the mass of the piston and the frictional forces thereon decrease with length of the piston. Also, if the diameter of the passageway 16a is increased, the forces required to change the piston 15a from one end of the chamber to the other decreases since the restriction to the passage of mercury from one end of the piston 15a to the other decreases. Thus, if greater ease of switching and greater sensitivity is desired, the diameter of the passageway 16a should be increased and the length as well as the diameter of the piston 15a decreased. If greater stability is desired, the diameter of the passageway 16a should be decreased and the outer diameter and length of the piston 15a increased.

An actual model of an automatic switch similar to that of FIGS. 2 and 2A have the dimensions listed in Table I.

TABLE I

| | Inch |
|---|---|
| Outside diameter of piston 15a | .093 |
| Diameter of passageway 16a | .030 |
| Outside diameter of container 13a | .125 |
| Length of container 13a | .280 |
| Outside diameter of solenoid windings 22 and 24 | .310 |
| Length of both windings 22 and 24 | .360 |

It should be understood that there are re-arrangements of the automatic switch of FIG. 2 within the scope of this invention. By way of example, the two windings 22 and 24 may be separated and the permanently magnetized piston 15a replaced by a magnetic piston which is not permanently magnetized. With such an arrangement current is passed through only one of the windings at a time and the piston is forced to the end of the chamber adjacent the winding through which the electrical current is passed. Additionally, the mercury may be replaced by other conductive liquids. Also, the contacts 25 and 27 may be made wettable to mercury to eliminate contact erosion. Also, it may be desirable to recess the contacts and provide the contacts 25 and 27 with built-in mercury reservoirs.

Also, it may be desirable to form a vacuum around the mercury 18a in the chamber so as to make the chamber explosion proof. In the alternative an inert gas may be placed in the void space around the mercury. A gas may also be selected such as $H_2$ which reduces contact erosion. If a gas is placed around the mercury 18a it would be desirable in some instances to make the piston 15a porous to serve as a reservoir for such gas. Also, the gas placed in the chamber around the mercury 18a may be selected so as to provide a time delay in the change of the position of the piston 15a.

Figure 3:
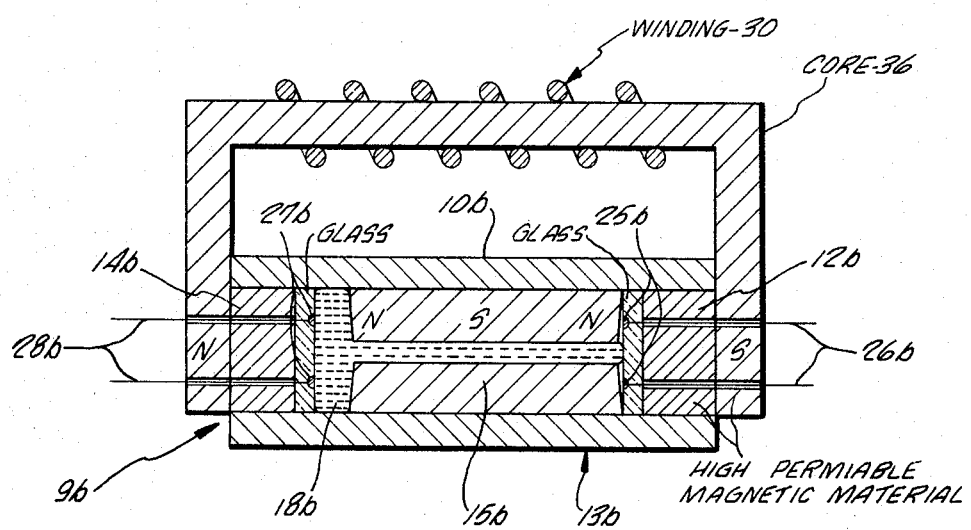
FIG. 3 is a cross-sectional view of an alternate bistable capsule and winding for use in the automatically actuated switch of FIG. 2 and embodying the present invention.

FIG. 3 is an alternate automatic switch for use in the electrical circuit of FIG. 2, and embodying the present invention. The bistable capsule 9b is similar to the bistable capsule 9a of FIG. 2 except that the glass plugs 14a and 12a of FIG. 2 are replaced by highly permeable magnetic plugs 14b and 12b, coated with a non-conductive ceramic glass in the chamber of the container 13b. The piston of the bistable capule 9b is similar to that of FIG. 2 except that it is permanently magnetized with like poles at opposite ends thereof.

In the bistable capsule 9b, the solenoid windings 22 and 24 of the switch of FIG. 2 are replaced by a C shaped core 36 made of a highly permeable magnetic material with a solenoid winding 38 wound thereon. The legs of the core 36 are in contact with the highly permeable magnetic plugs 12b and 14b. Thus, it may be seen that a low magnetic path is formed in between the ends of the piston 15b through the plug 14b, the core 36 and the plug 12b. In this manner, the magnetic field is concentrated at the ends of the piston 15b, thereby causing greater forces to be exerted thereon. The core 36 and plugs 12b and 14b are made of a nickel and iron alloy.

When current is passed through the winding 30 in such a direction that a magnetic field is generated at the plug 14b of the same polarity as that of the magnetization at the ends of the piston 15b, a repelling force is exerted between the plug 14b and the piston 15b tending to force the piston 15b to the opposite end of the chamber. Due to the winding arrangement, an oppositely poled field is generated at the plug 12b end of the piston and tends to exert a pulling force on the piston 15b. These forces force the piston against the plug 12b. When the current in the winding 30 is reversed, the magnetic field reverses and the piston 15b is forced against the plug 14b.

Figure 4:
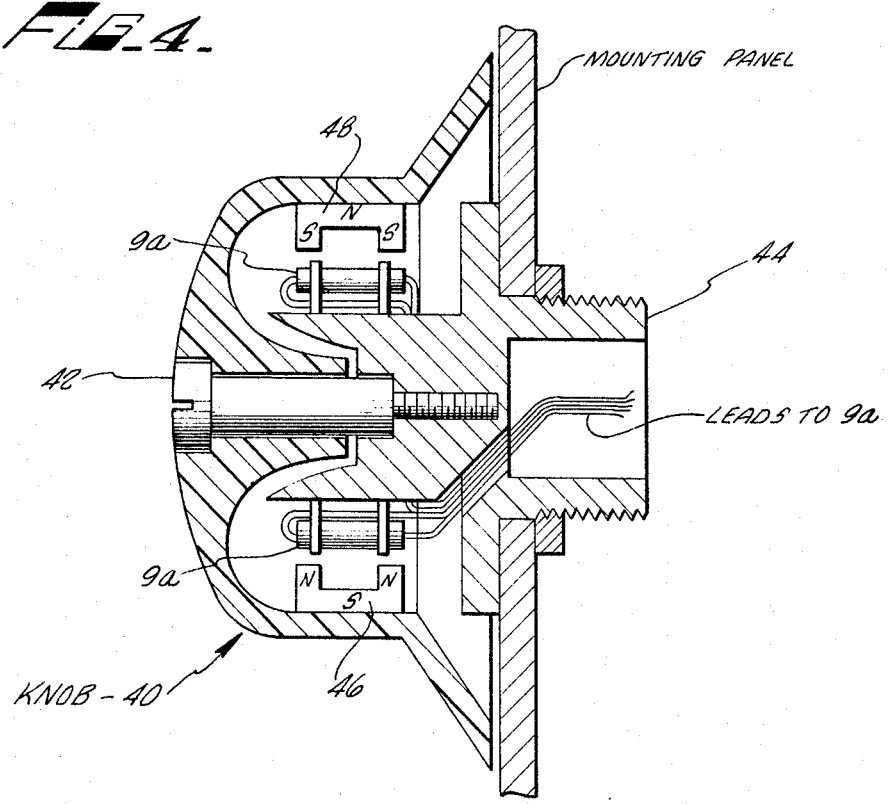
FIG. 4 is an alternate arrangement of the bistable capsule and means for forcing the piston of the capsule of FIG. 1.

FIG. 4 is an alternate specific arrangement of the bistable capsule 9 and means 7 for forcing of FIG. 1 in the form of manually operated switches. FIG. 4 is a side view of a panel mounted knob with a portion broken away to show two bistable switching capsules 9a identical to those of FIG. 2. The knob 40 is rotatable about a bearing formed by a centrally located screw 42. Screw bearing 42 is threaded for mating with a threaded hole in a switch capsule mounting member 44. The switch mounting member 44 contains a circular protrusion extending into a hollow interior of the knob 40. The protrusion of the switch capsule mounting member 44 contains the two rigidly attached bistable switching capsules 9a mounted on the periphery thereof. At the interior of the knob 40 two permanent magnets 46 and 48 are mounted corresponding to the two switch capsules 9a. The permanent magnets 46 and 48 are C shaped and are attached to the knob 40 such that the legs thereof may be rotated adjacent the ends of the switch capsules 9a. The magnet 46 has like poles of one polarity at the ends of the legs thereof whereas the magnet 48 has like poles of an opposite polarity from the magnet 48 at the ends of the legs thereof. When the knob 40 is rotated to a position wherein the magnet 46 is adjacent a switch capsule 9a as indicated at the lower portion of the FIG. 4, the permanent magnet 46 is poled such that the magnetic forces developed between the magnet 46 and the permanent magnetic piston 15a of the bistable capsule 9a (see FIG. 2) force the piston 15a to one end of the chamber of the bistable capsule 9a. When the knob 40 is rotated with magnet 48 adjacent a switch capsule 9a as indicated at the top of FIG. 4, magnetic forces are developed between the piston 15a of the capsule 9a and the magnet 48, forcing it to the opposite end of the chamber from the forces due to the permanent magnet 46.

Figure 5A:
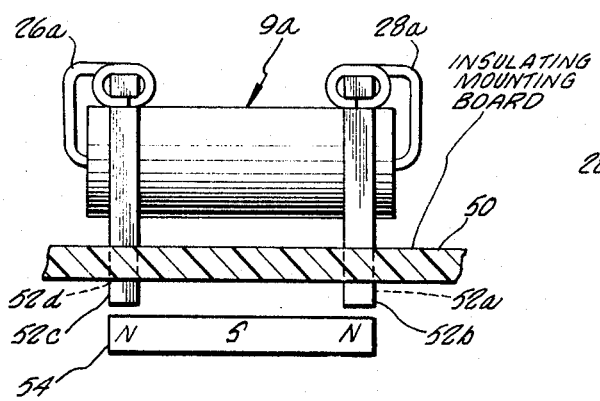
FIG. 5A is a side elevation view and FIG. 5B an end view of an alternate arrangement of the bistable capsule and means for forcing the piston of the capsule shown in FIG. 1 in the form of a switch wherein a permanent magnet operates the piston of a bistable switching capsule mounted on an insulating mounting board and embodying the present invention.
Figure 5B:
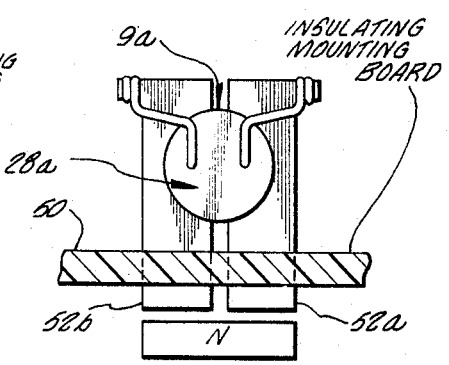

FIG. 5A shows a side elevation view of an alternate manually operated switch exemplifying the diagram of FIG. 1 and embodying the present invention. FIG. 5B is an end view of the side elevation view of FIG. 5A. In FIGS. 5A and 5B a bistable capsule 9a, identical to that shown in FIG. 2, is mounted on an insulating mounting board 50 by means of four mounting terminals 52a, 52b, 52c, and 52d. The mounting terminals 52a, 52b, 52c, and 52d each contain a concave portion for partially surrounding the sides of the bistable capsule 9a. The ends of the mounting terminals extend down through and are rigidly attached to the insulating board 50 to provide a rigid support for the bistable switching capsule 9a. The mounting terminals 52a, 52b, 52c, and 52d are formed of a highly permeable material and when mounted for supporting a capsule 9a form a gap in between the opposing mounting terminal. The manually operated switch of FIGS. 5A and 5B switches by placing a permanent magnet 54 having like poles at the opposite ends thereof, adjacent the mounting terminals. The magnet 54 is formed with a length equal to that in between the pair of mounting terminals 52a and 52b and the pair of mounting terminals 52c and 52d. When the permanent magnet 54 is placed adjacent the ends of the mounting terminals, lines of flux from the permanent magnet 54 pass from the permanent magnet up through the highly permeable mounting terminals to the ends of the piston 15a of the switch capsule 9a. In this manner flux is concentrated symmetrically about the ends of the piston 15a. Additionally, the mounting terminals may be used for solder terminals for the leads of the capsule 9a.

Refer now to FIG. 6 wherein a polarized capsule 9c is shown. The polarized bistable capsule 9c of FIG. 6 is an alternate arrangement of the switching capsule for use in FIGS. 1 and 2. The switching capsule 9c has a container 13c similar to that of FIG. 2. Also, the switching capsule 9c has a piston 15c which is similar to that of FIG. 1 except that a groove is machined around the outer periphery of the piston 15c to allow a coil spring 58 to be threaded thereon. The coil spring 58 contains a central coil with a greater diameter than the rest of the spring which extends out into an anchoring groove 59 formed in the chamber wall of the container 13c. The anchoring groove and the coil spring 58 are positioned such that a force is normally exerted on the piston 15c forcing it towards one end of the chamber of the container 13c. When a force is applied to the piston 15c relative to the container 13c which overcomes the force of the spring 58, the piston 15c is forced to the other end of the chamber. When the force on the piston 15c is released, the coil spring 58 forces the piston 15c back to its normal position. The bistable capsule 9c also contains two pairs of leads 26c and 24c and contacts 27c and 25c identical to those shown in FIG. 2.

FIG. 7 shows an alternate switching capsule 9d for substitution in place of the bistable capsules of FIGS. 1 and 2. The switching capsule 9d is similar to the capsule 9a of FIG. 2 except that the sleeve 10d is made of a permanent magnetic material, such as a ferrite material, polarized with like poles at the opposite ends thereof. Also, the glass plugs 12a and 14a of FIG. 2 are replaced by plugs of highly permeable material. The interior of the chamber is coated with ceramic glass so as to form a non-conductive and non-mercury wettable chamber surface. The contacts 27d and 25d are exposed to the mercury 18d in the chamber. The highly permeable material of the plugs 14d and 12d are connected directly to the permanent magnet outer sleeve 10d. The permanent magnetic sleeve 10d provides a permanent magnetic field through the plugs 14d and 12d to the ends of the permanent magnetic piston 15d which cause forces on the piston 15d normally forcing it to the end of the chamber at the plug 12d. The operation of the capsule 9d is similar to that of FIG. 6 except magnetic polarization is used rather than spring polarization.

FIG. 8 shows an alternate piston 15e for use in the bistable capsule of FIGS. 1 and 2. The piston 15e has four wettable grooves 60 evenly spaced about the outer surface thereof and running parallel to the axis thereof. The grooves 60 replace the centrally located passageway 16 of the bistable capsule 9 of FIG. 1.

Refer to FIG. 8A wherein a cross-sectional view of the bistable capsule of FIG. 1 is shown along the line B—B with the piston 15e inserted therein. In the bistable capsule 9 of FIG. 8A, a quantity of mercury 18 is placed in the void space of the chamber in the container 13 including the grooves 60. As indicated, the mercury in the channels 60 actually provide bearings for supporting the piston 15e out of contact with the walls of the chamber of the container. Stability is again provided by the large quantity of mercury 18 (not shown) which is at one end of the piston 15e.

FIG. 9 is a cross-sectional view of an alternate bistable capsule for use in FIGS. 1 and 2. FIG. 9 shows a bistable capsule 9f, similar to that of FIG. 2 except that the piston 15a is replaced by the piston 15e of FIG. 8. Additionally, the leads 28a and 26a and the contacts 27a and 28a at the ends of the container 13a are replaced by a single conductive lead 61 positioned centrally in the end of the plug 14f and a steel sleeve 10f. As shown in FIG. 9, when the mercury 18f is at the plug 14f end of the bistable capsule 9f, it forms an electrical conductive path between the central lead 61 and the steel sleeve 10f.

FIG. 10 shows an alternate bistable capsule 9g for FIGS. 1 and 2 wherein a square shaped chamber and piston 15g is provided as opposed to a round chamber and piston.

Refer now to FIGS. 11 and 11A wherein an alternate switch capsule arrangement is shown for use inside of the solenoid windings 22 and 24 of FIG. 2. FIG. 11 shows a cross-sectional view of two bistable capsules 9h and 9i arranged in the form of an annular shaped coaxial switch. FIG. 11 is a view cut parallel to the axis of the switch. FIG. 11A is a cross-sectional view of the coaxial switch of FIG. 11 along the line A—A of FIG. 11 but with the portion cut away in FIG. 11 shown in full.

The coaxial switch of FIGS. 11 and 11A have a container 62 made of ceramic glass for enclosing and forming the containers of the bistable capsules 9h and 9i. The bistable capsule 9i has a permanent magnetic piston 15i identical to the piston 15a of FIG. 2. The chamber in the container 62 for the bistable capsule 9i is identical to the chamber in the container 13a of FIG. 2. The bistable capsule 9h has a tubular shaped piston 15h whose outside diameter is slightly less than that of a tubular shaped chamber of the container 62. The inside diameter of the tubular piston 15h is greater than that of the inside diameter of the tubular shaped chamber of the container 62 to provide a tubular shaped passageway 16i in between the ends of the piston 15h. Similar to the piston 15a of FIG. 2, the tubular shaped piston 15h is shorter than the length of the tubular shaped chamber of the container 62 to provide a void space in the chamber at the ends thereof. A quantity of mercury 18h is filled in the void space of the tubular shaped chamber and in the passageway 16h.

Coaxial cables 66 and 68, shown in cross section, are connected at opposite ends of the coaxial switch of FIG. 11. The coaxial cable 68 has a tubular shaped conductive shield 70 which is connected to the container 62 and has an end exposed in the tubular shaped chamber. The end of the shield 70 is exposed to the tubular shaped chamber near the outer diameter thereof. The coaxial cable 68 also has a central conductor 72 which is connected and exposed eccentric to the central axis of the cylindrical shaped chamber of the bistable capsule 9i.

The coaxial cable 66 has an outer shield 74 connected to the container 62 and has an end exposed to the interior of the tubular shaped chamber of the bistable capsule 9h adjacent the passageway 16h such that when the piston 15h is positioned against the end of the container 62 to which the shield 74 is connected, the end of the quantity of mercury in the passageway 16h is in electrical contact therewith. The central conductor 76 is also connected to the container 62 and has an end exposed to the chamber of the bistable capsule 9i adjacent the passageway 16i.

When the pistons 15h and 15i are forced against the coaxial cable 66 end of the container 62, the quantities of mercury 18h and 18i are forced into the void spaces at the ends of the pistons 15h and 15i and form separate electrical contacts with the shield 70 and the central conductor 72. At the opposite end of the container 62, the quantities of mercury 18h and 18i form separate electrical contacts with the shield 74 and the central conductor 76. Therefore, a complete coaxial circuit is formed between the coaxial cables 68 and 66. When the pistons 15h and 15i are forced against the coaxial cable 68 end of the container 62, quantities of mercury 18h and 18i are forced through the passageways 16h and 16i to the void spaces at the ends of the chambers adjacent the cable 66. In this state of the coaxial switch, the quantities of mercury 18h and 18i are no longer in contact with the shield 70 nor the central conductor 72 and the conductive paths between the coaxial cables 66 and 68 are broken.

Although an annular switch having a plurality of switch capsules has been shown by way of example it should also be understood that a plurality of switch capsules 9a of FIG. 2 may be placed adjacent one another inside of a solenoid winding and actuated together by the same winding.

FIG. 12 shows a perspective view of an alternate high current contact and lead arrangement for use in the switch capsule of FIG. 2 with portions of the capsule broken away. As indicated, two generally C shaped contacts 82 are provided extending through the plug 14j of the switch capsule 9j to the chamber therein. External electrical contact with the contacts 82 are made by means of two fuse type clips 84 which frictionally engage the contacts 82 and provide both support for the capsule 9j and electrical contact with the contacts 82.

Although specific examples of contact arrangements have been shown, there are many other arrangements within the scope of the present invention. For example, the contacts may be located in the chamber side wall rather than in the plugs at the ends of the wall. In the alternative the piston may be arranged to form the shorting medium for the contacts and the stabilizing liquid may be a non-conductive liquid.

It should also be understood that a passageway may be placed in the container walls and arranged to interconnect the ends of the chamber to provide a path for the flow of the stabilizing liquid within the broad scope of the present invention. In this arrangement the passageway in the piston may be removed.

Also, it should be understood that the bistable capsule of FIG. 1 may be employed in other embodiments other than a switch, and still come within the scope of this invention. By way of example, the bistable capsule may be positioned partly extending into the axis of an inductor and be used as a slug to vary the inductance of the inductor depending upon the position of the piston. In such an arrangement, suitable piston material will be employed. Also, it would not be necessary to use a conductive stabilizing liquid but a non-conductive liquid having surface tension and viscous characteristics similar to that of mercury may be used.

What is claimed is:
1. A bistable element comprising:
 (a) a container having a chamber with at least one side wall and at least one end wall adjacent each end of said side wall for enclosing said chamber,
 (b) a member slidably mounted in said chamber having an outer surface of substantially the same shape as said side wall and closely fitting against said side wall but being shorter than the length thereof in between said end walls causing a void space in said chamber and comprising,
  (1) a passageway for inter-connecting the void space at the ends of said member, and
 (c) a quantity of mercury at least substantially filling said void space said chamber walls and member being adapted so that movement of said member to either end wall of said chamber causes substantially all of said quantity of mercury in between such chamber end wall and said member to be moved out therefrom and moved through said passageway into a position in between the other end wall of said chamber and said member, surface tension of said mercury maintaining said member at the opposite end wall of said chamber from said quantity of mercury.
2. A bistable electrical switch comprising:
 (a) a container having a chamber therein with at least one enclosing wall having opposite surfaces which are substantially parallel and having enclosing ends at each end of said chamber wall,
 (b) a non-conductive member positioned within and having substantially the same shape as the chamber in between said enclosing wall and characterized as responsive to a moving force for slidably moving from one end of said chamber to the other end thereof,
 (c) a quantity of mercury substantially filling space in said chamber in between the member and the ends of said chamber,
 (d) a passageway for providing a path for the movement of mercury in between the ends of said member,
 (e) means for exerting a force on said member to thereby move same from one end of said chamber to the other, said member and container being adapted so that movement of said member to either end of said chamber causes substantially all of said quantity of mercury in between such chamber end and said member to be moved out therefrom and moved through said passageway into a position in between the other end of said chamber and said member, surface tension of said mercury maintaining said member in a stable position until said means (e) applies a moving force to said member, and
 (f) at least one pair of conductive means exposed at one end of said chamber and arranged to be electrically shorted together by said mercury when the member is at the opposite end of said chamber.
3. A bistable electrical switch comprising:
 (a) a container having,
  (1) an elongated cylindrical shaped chamber and
  (2) at least one pair of electrical conductive means exposed adjacent an end of said chamber,
 (b) a magnetic piston positioned within and having an outer dimension substantially equal to that of said chamber, said piston being characterized as having a cylindrical shape and a length less than that of said chamber to provide a void space for movement of said piston therein and comprising, a plurality of wettable grooves spaced around the outer surface of and running the length of said piston,
 (c) a quantity of mercury at least substantially filling said void space and said grooves in between said piston and the wall of said chamber to form a bearing for said piston, and
 (d) means positioned for applying a magnetic field of sufficient magnitude at the ends of said piston for thereby causing a force to be exerted thereon relative to said container forcing said piston to an end of said chamber, said container and piston being adapted so that movement of said piston to either end of said chamber causes substantially all of said quantity of mercury in between such end of such chamber and said piston to be moved out therefrom and moved through said grooves into a position in between the other end of said chamber and said piston, surface tension of said mercury holding said piston at one end of said chamber until said means (d) applies a magnetic field forcing the piston to a different end of said chamber, said quantity of mercury forming an electrical short circuit between said pair of conductive means when positioned at the corresponding end of said chamber.
4. A bistable element comprising a container having a chamber therein with two spaced apart end walls, a member slidably mounted in said chamber in between said end walls and having first and second end walls each facing one of the end walls of said chamber, said member being shorter than the distance in between said chamber end walls to provide a void space in the chamber, a passageway interconnecting the end walls of said member, a quantity of stabilizing liquid at least substantially filling said void space, the facing end walls of said chamber and member conforming such that movement of said member to either end wall of said chamber causes said member to force substantially all of said quantity of liquid in between such chamber end wall and the facing end wall of said piston out therefrom through said passageway to a position in between the other facing end walls of said chamber and piston, said liquid being characterized whereby surface tension thereof maintains said member at the opposite end wall of such chamber from said quantity of liquid.
5. A bistable element comprising a container having a chamber therein with two spaced apart end walls, a member slidably mounted in said chamber in between said end walls and having first and second end walls each facing one of the end walls of said chamber, said member being shorter than the distance in between said chamber end walls to provide a void space in the chamber, a passageway interconnecting the end walls of said member, a quantity of stabilizing liquid at least substantially filling said void space, the facing end walls of said chamber and member conforming such that movement of said member to either end wall of said chamber causes said member to force substantially all of said quantity of liquid in between such chamber end wall and the facing end wall of said piston out therefrom through said passageway to a position in between the other facing end walls of said chamber and piston, said liquid being characterized whereby surface tension thereof maintains said member at the opposite end wall of such chamber from said quantity of liquid and a pair of spaced apart electrical contacts positioned in one end wall of said chamber and electrical conductors connecting such contacts to the outside of said chamber, said liquid further being characterized whereby it is an electrical conductive material and electrically connects said contacts together when positioned at the corresponding end wall of said chamber.
6. A bistable element comprising a container having a chamber therein with two spaced apart end walls, a member slidably mounted in said chamber in between said end walls and having first and second end walls each facing one of the end walls of said chamber, said member being shorter than the distance in between said chamber end walls to provide a void space in the chamber, a passageway in said member interconnecting the end walls of said member, a quantity of stabilizing liquid at least substantially filling said void space, the facing end walls of said chamber and member conforming such that movement of said member to either end wall of said chamber causes said member to force substantially all of said quantity of liquid in between such chamber end wall and the facing end wall of said piston out therefrom through said passageway to a position in between the other facing end walls of said chamber and piston, said liquid being characterized whereby surface tension thereof maintains said member at the opposite end wall of such chamber from said quantity of liquid.

7. A bistable element comprising a container having a chamber therein with two spaced apart end walls, a member slidably mounted in said chamber in between said end walls and having first and second end walls each facing one of the end walls of said chamber, said member being shorter than the distance in between said chamber end walls to provide a void space in the chamber, a passageway in said member interconnecting the end walls of said member, a quantity of stabilizing liquid at least substantially filling said void space and said passageway, the facing end walls of said chamber and member conforming such that movement of said member to either end wall of said chamber causes said member to force substantially all of said quantity of liquid which is positioned in between such chamber end wall and the facing end wall of said piston out therefrom through said passageway to a position in between the other facing end walls of said chamber and piston, said liquid being characterized whereby surface tension thereof maintains said member at the opposite end wall of such chamber from the end walls of said member and chamber between which said liquid is positioned.

8. A bistable element comprising a container having a chamber therein with two spaced apart end walls, a member slidably mounted in said chamber in between said end walls and having first and second end walls each facing one of the end walls of said chamber, said member being shorter than the distance in between said chamber end walls to provide a void space in the chamber, a passageway interconnecting the end walls of said member, a quantity of mercury at least substantially filling said void space, the facing end walls of said chamber and member conforming such that movement of said member to either end wall of said chamber causes said member to force substantially all of said quantity of mercury in between such chamber end wall and the facing end wall of said piston out therefrom through said passageway to a position in between the other facing end walls of said chamber and piston, surface tension of said mercury maintaining said member at the opposite end wall of such chamber from said mercury.

9. A bistable element comprising a container having a chamber therein with two spaced apart end walls, a member slidably mounted in said chamber in between said end walls and having first and second end walls each facing one of the end walls of said chamber, said member being shorter than the distance in between said chamber end walls to provide a void space in the chamber, a passageway interconnecting the end walls of said member, a quantity of stabilizing liquid at least substantially filling said void space, the facing end walls of said chamber and member conforming such that when a predetermined force is applied to said member moving it to either end wall of said chamber said member forces substantially all of said quantity of liquid in between such chamber end wall and the facing end wall of said piston out therefrom through said passageway to a position in between the other facing end walls of said chamber and piston, said liquid being characterized whereby surface tension thereof maintains said member at the opposite end wall of such chamber from said quantity of liquid under applied forces to said member below said predetermined force.

10. A bistable element comprising a container having a chamber therein with two substantially flat spaced apart end walls, a member slidably mounted in said chamber in between said end walls and having first and second substantially flat end walls each parallel with and facing one of the end walls of said chamber, said member being shorter than the distance in between said chamber end walls to provide a void space in said chamber, a passageway interconnecting the end walls of said member, a quantity of stabilizing liquid at least substantially filling said void space, movement of said member to either end wall of said chamber causes said member to force substantially all of said quantity of liquid in between such chamber end wall and the facing end wall of said piston out therefrom through said passageway to a position in between the other facing end walls of said chamber and piston, said liquid being characterized whereby surface tension thereof maintains said member at the opposite end wall of such chamber from said quantity of liquid.

11. A bistable element comprising a container having an elongated circular shaped chamber therein with two substantially flat spaced apart end walls, an elongated cylindrical shaped member slidably mounted in said chamber in between said end walls and having first and second substantially flat end walls each parallel with and facing one of the end walls of said chamber, said member being shorter than the distance in between said chamber end walls to provide a void space in said chamber, a passageway in said member at substantially the center thereof interconnecting the end walls of said member, a quantity of stabilizing liquid at least substantially filling said void space and passageway, a predetermined force applied to said member causing movement of said member to either end wall of said chamber thereby causing said member to force substantially all of said quantity of liquid which is positioned in between such chamber end wall and the facing end wall of said piston out therefrom through said passageway to a position in between the other facing end walls of said chamber and piston, said liquid positioned in said passageway being in contact with the end of wall of said chamber at which said member is positioned but not in between such chamber end wall and the facing member end wall and characterized whereby surface tension thereof maintains said member at the opposite end wall of such chamber from the end walls of said member and chamber between which said liquid is positioned.

12. A coaxial switch combination of which comprises:
(a) a container having,
(1) an elongated tubular shaped chamber, and
(2) an elongated cylindrical shaped chamber positioned along the axis of said tubular shaped chamber,
(b) a permanently magnetized tubular shaped piston slidably mounted within said tubular shaped chamber (a) (1) and formed to provide a passageway interconnecting the ends of said tubular shaped chamber (a) (1) at the ends of said tubular shaped piston,
(c) a permanently magnetized cylindrical shaped piston slidably mounted within said cylindrical shaped chamber (a) (2) and including a passageway interconnecting the ends of said cylindrical shaped chamber at the ends of said cylindrical shaped piston,
(d) a quantity of mercury substantially filling the space in said tubular shaped chamber (a) (1) adjacent to said tubular shaped piston (b) and said passageway formed thereby,
(e) a quantity of mercury substantially filling the passageway of said cylindrical shaped piston (c) and the space of said cylindrical shaped chamber (a) (2) adjacent to said cylindrical shaped piston (c),
(f) at least one contact exposed at each end of said tubular shaped chamber (b) adjacent opposite radial extremities thereof, and
(g) at least one contact exposed at each end of said cylindrical shaped chamber (c), one of the later mentioned contacts being positioned opposite the passageway of said cylindrical shaped pistons (c) and the other being positioned a preselected distance therefrom.

13. A coaxial switch combination of which comprises:
 (a) a container having,
  (1) a first tubular shaped chamber having first and second ends, and
  (2) a second chamber concentric with said tubular shaped chamber and having first and second ends,
 (b) a first member slidably mounted in between the ends of said tubular shaped chamber and formed to provide a first passageway interconnecting the ends of said tubular shaped chamber at the ends of said first member,
 (c) a second member slidably mounted in between the ends of said second chamber and including a second passageway interconnecting the ends of said second chamber,
 (d) a quantity of mercury substantially filling the space in said first chamber which is left by said first member and the space in said first passageway,
 (e) a quantity of mercury substantially filling said second passageway and the space in said second chamber which is left by said first member, said first and second members being adapted for switching the mercury from one end of the members to the other in response to movement thereof,
 (f) at least one contact exposed at each end of said first chamber, at least one contact being positioned opposite the end of said first passageway and the other contact being positioned a preselected distance from said first passageway to thereby cause an electrical contact through the mercury between the contacts when the first member is in a first position and to cause an open circuit between the contacts when the first member is in a second position, and
 (g) at least one contact exposed at each end of said second chamber, one of the later mentioned contacts being positioned opposite said second passageway and the other being positioned a preselected distance therefrom so that electrical contact is made through the mercury between the contacts when the second member is in a first position and an open circuit is formed between the contacts when the first member is in a second position.

14. A bistable device comprising:
 (a) container means having interior walls defining an elongated chamber having first and second end walls and a side wall,
 (b) an elongated member slidably mounted and movable in between the ends of said chamber on said side wall and dimensioned for providing a void space in said chamber in between an end of said chamber and said member when said member is positioned at one end wall of said chamber, said member including a passageway comprising a plurality of wettable grooves spaced around the outer surface of and running the length of said elongated member, and
 (c) a quantity of mercury substantially filling the void space in said chamber and additionally filling said grooves and forming a bearing between the member and said third wall, said chamber and member being adapted such that movement of said member to either end wall of said chamber causes substantially all of said quantity of mercury to be forced out from in between such end wall and said member and move through said grooves into a position in between the opposite end wall and said member, surface tension of said quantity of mercury maintaining said member at the opposite end of the chamber from which the quantity of mercury is positioned regardless of the position of the container.

References Cited by the Examiner

UNITED STATES PATENTS

| 2,640,890 | 6/1953 | Johnson | 200—112.2 |
| 2,914,633 | 11/1959 | Houser | 200—112.2 |

ROBERT K. SCHAEFER, *Primary Examiner.*

ROBERT K. SCHAEFER, KATHLEEN H. CLAFFY,
*Examiners.*

UNITED STATES PATENT OFFICE
CERTIFICATE OF CORRECTION

Patent No. 3,274,522                          September 20, 1966

Peter V. N. Heller

It is hereby certified that error appears in the above numbered patent requiring correction and that the said Letters Patent should read as corrected below.

Column 1, line 40, beginning with "Additionally," strike out all to and including "chamber." in line 42, same column 1.

Signed and sealed this 22nd day of August 1967.

(SEAL)
Attest:

ERNEST W. SWIDER
Attesting Officer

EDWARD J. BRENNER
Commissioner of Patents